Oct. 5, 1965    J. F. MEACHAM    3,210,716
BUS STRUCTURE
Filed Aug. 16, 1962    7 Sheets-Sheet 1

INVENTOR.
JAMES F. MEACHAM
BY
OSTROLENK, FABER, GERB & SOFFEN
ATTORNEYS

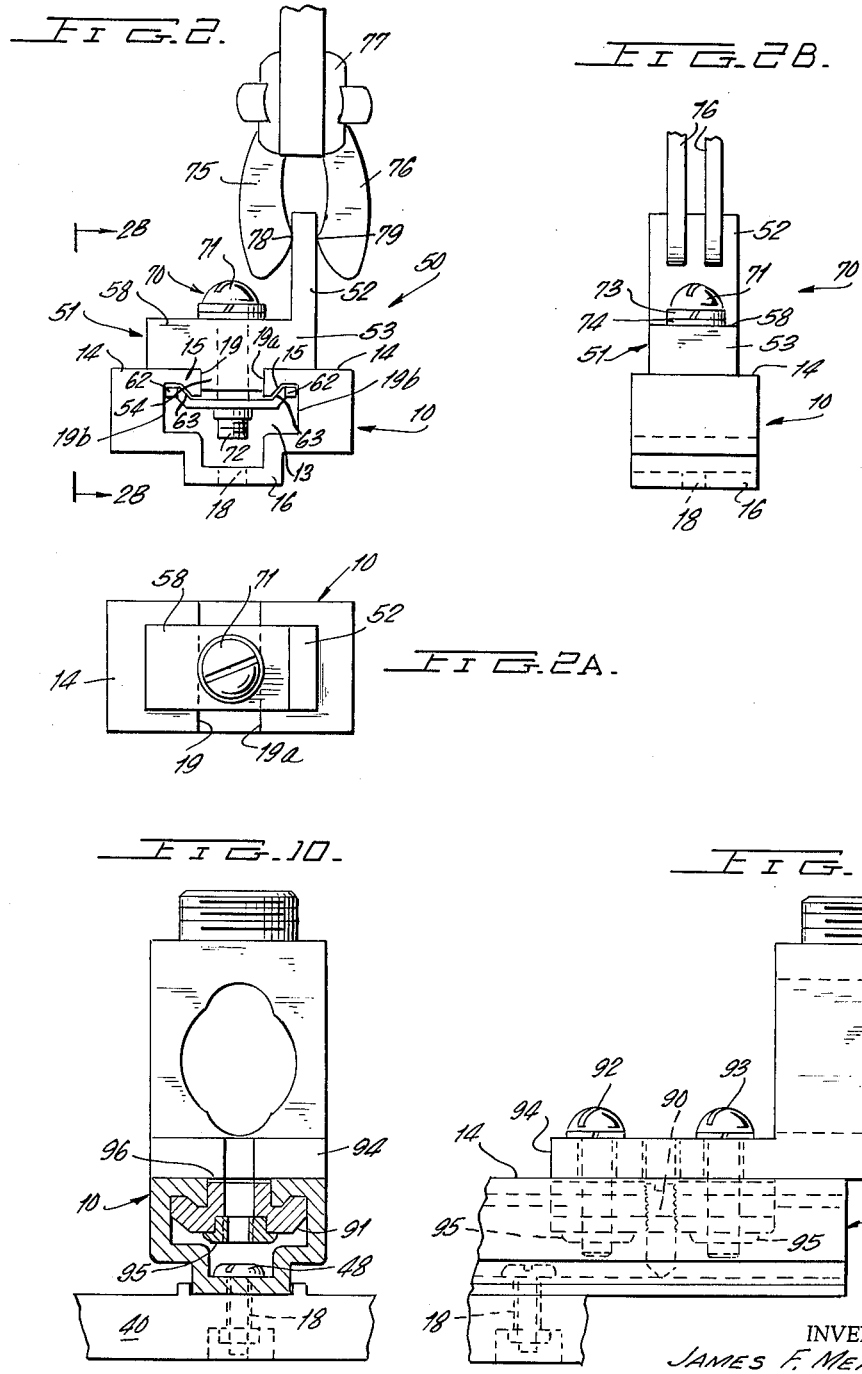

Oct. 5, 1965  J. F. MEACHAM  3,210,716
BUS STRUCTURE
Filed Aug. 16, 1962  7 Sheets-Sheet 3
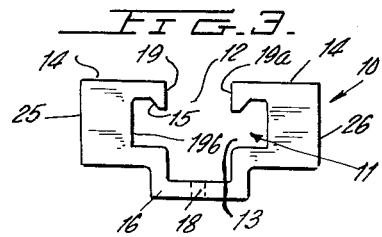
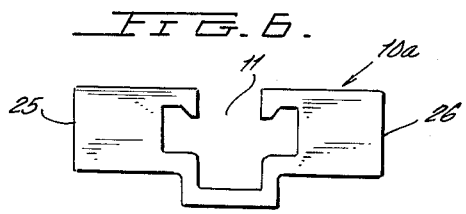
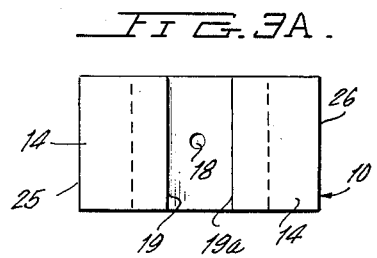
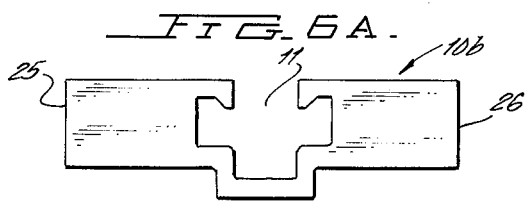
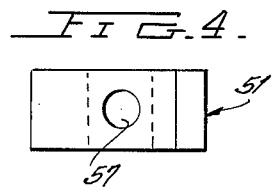
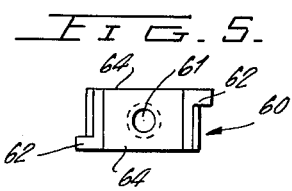
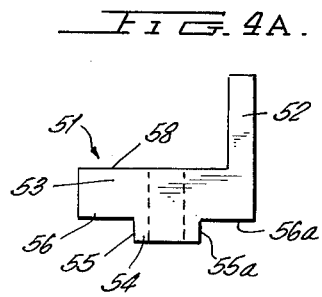
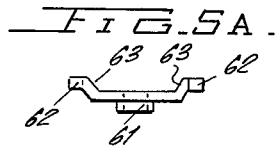
INVENTOR.
JAMES F. MEACHAM
BY
OSTROLENK, FABER, GERB & SOFFEN
ATTORNEYS

INVENTOR.
JAMES F. MEACHAM
BY
OSTROLENK, FABER, GERB & SOFFEN
ATTORNEYS

Oct. 5, 1965

J. F. MEACHAM 3,210,716

BUS STRUCTURE

Filed Aug. 16, 1962

INVENTOR.
JAMES F. MEACHAM
BY
OSTROLENK, FABER, GERB & SOFFEN
ATTORNEYS

Oct. 5, 1965  J. F. MEACHAM  3,210,716
BUS STRUCTURE

Filed Aug. 16, 1962  7 Sheets-Sheet 6

INVENTOR.
JAMES F. MEACHAM
BY
OSTROLENK, FABER, GERB & SOFFEN
ATTORNEYS

Oct. 5, 1965 J. F. MEACHAM 3,210,716
BUS STRUCTURE
Filed Aug. 16, 1962 7 Sheets-Sheet 7
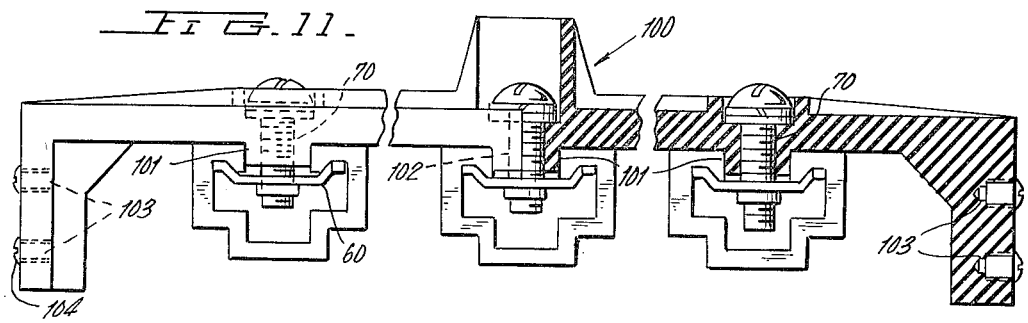
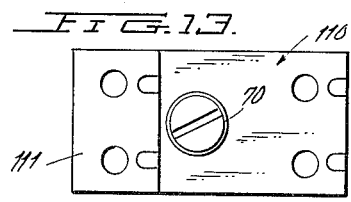
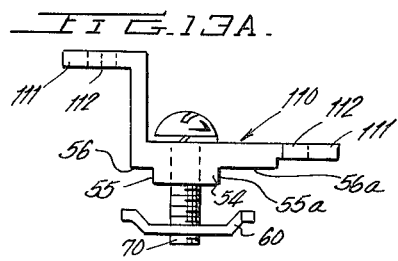
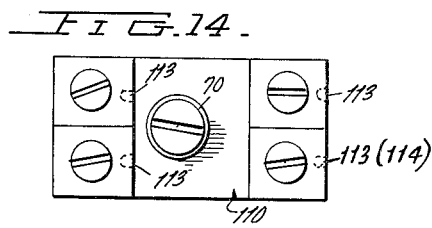
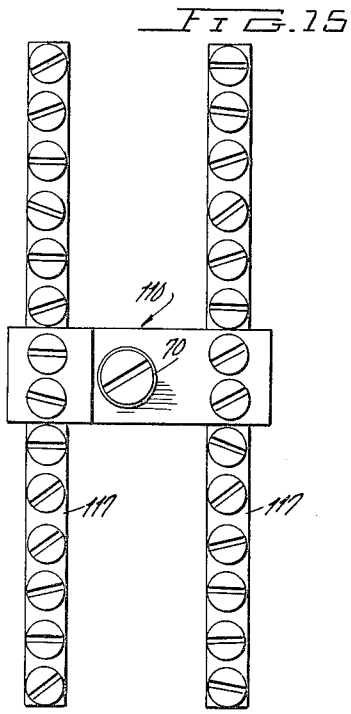
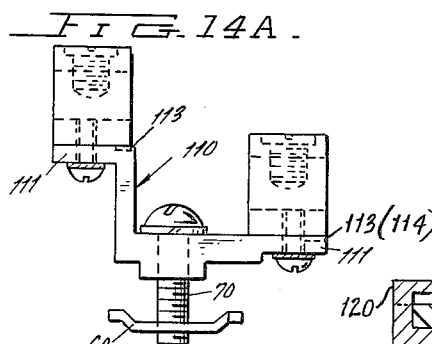
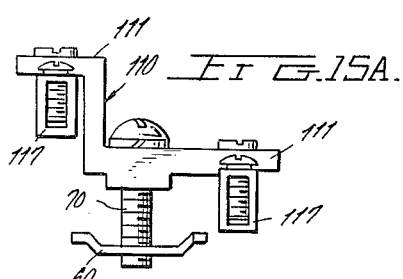
INVENTOR.
JAMES F. MEACHAM
BY
OSTROLENK, FABER, GERB & SOFFEN
ATTORNEYS ved Oct. 5, 1965

3,210,716
BUS STRUCTURE
James F. Meacham, Atlanta, Ga., assignor to I-T-E Circuit Breaker Company, Philadelphia, Pa., a corporation of Pennsylvania
Filed Aug. 16, 1962, Ser. No. 217,453
9 Claims. (Cl. 339—21)

This invention relates to a bus structure adapted to permit power tap-off at any point along the length of a bus bar, and more particularly to an improved assembly of a contact strap and its securing means which is inserted in a cooperating bus bar channel.

In many electrical installations it is oftentimes desirable to provide a bus bar which permits power to be tapped-off at any point along its length. Such a system allows a single panelboard structure to be readily adapted for various arrays of circuit breakers or other types of electrical equipment.

One arrangement well known in the prior art is to provide a number of threaded openings along the length of the bus bar. At the required power tap-off points contacts may then be threadably attached to the bus bar. However, such discontinuities in the bus bar cross-section has the disadvantage of interfering with the longitudinal current flow. This necessitates increasing the cross-sectional area of the bus bar to counteract the effect of the increased resistance at those points. Also the periodic decrease in the cross-sectional area at the threaded openings could also result in warping and distortion of the bus bar.

Another way shown in the prior art is to construct the bus bar with a channel containing a given number of movable inserts captured therein. One such arrangement is shown in United States Patent No. 2,969,421, issued January 24, 1961, and entitled, "Low X Bus," in the name of William Scott, Jr., and assigned to the assignee of the instant invention. Scott shows a number of generally T-shaped inserts permanently placed within a similarly shaped channel during the installation of the bus bar to the panelboard. The inserts are threaded to receive a connecting strap which when secured thereto will make electrical contact with the top surface of the bus bar.

A somewhat different configuration, used to secure a trolley bus to its housing, is shown in United States Patent No. 2,882,356, issued April 14, 1959, entitled, "Trolley Duct With Formed Bus Bars," in the name of R. S. Davis et al., also assigned to the assignee of the instant invention. Slidable inserts containing threaded shafts are permanently contained within the trolley bus channel. A knob-like member engages the insert shaft and when tightened obtains engagement to one of the surfaces of the bus bar to secure it to the trolley housing.

Thus, it is seen that in both of the prior art devices which avoid the use of threaded openings in the bus bar, the inserts are permanently captured within a channel during the installation of the bus bar to the panelboard. Thus, the initial installation determines the number of power tap-offs, and, non-engaged power tap-offs are free to move around in the bus. Also, electrical engagement of the power tap-off connector is only to the top surface of the bus bar.

My invention permits any number of power tap-off connectors to be added to or be removed from the bus bar after final installation thereof to a panelboard. Also, the contacting strap engages both the top surface of the bus bar and the transverse channel portion thereby maximizing the contact area. In addition, numerous other advantages may be achieved from preferred configurations of the instant invention.

Briefly stated, my invention includes an integrated power tap-off assembly which is inserted in a specially formed bus bar channel. The assembly contains a strap mounted above the bus bar and projecting partially into the bus bar channel to establish two electrical contact areas with the bus bar: (1) along the portion which projects into the channel, and (2) at the top surface of the bus bar. A fastener portion of the assembly is located within the bus bar channel. The assembly also includes a fastening connector, such as a screw, accessible from the strap surface which is outside of the bus bar. The fastener and its connector are operatively related to the other members of the power tap-off means such that rotation of the screw will secure the strap to the bus bar. In addition, the fastener and bus bar channel shapes may be so interrelated that the tightening of the strap will increase the contact forces exerted at both of the established contact areas between the strap and the bus bar.

The integrated power tap assembly may be readily added to or removed from an installed panelboard. Also, the assembled parts are prevented from becoming disengaged, thereby eliminating the presence of extraneous parts in the bus bar channel.

The mating of the strap and the bus bar channel to establish an electrical contact area also serves to prevent the relative rotation between these members. Thus, proper alignment will always be maintained between the bus bar and the contacts of the power tap-off strap.

An additional advantage of the instant invention is that the same size channel may be used for different power ratings of bus bars, thereby permitting the same power tap-off assemblies to be interchangeably used. To provide for the increased current carrying requirements of the various buses, the cross-sectional area of the bus may be increased at an area remote from the channel.

Another advantageous feature of the instant invention is that the required configuration of bus bar channel permits a hollowed bus with a large internal surface area. Such a structure provides improved heat dissipation over the bus bar configurations of the prior art.

An additional feature of the instant invention is to include a longitudinal center rib along the bottom surface of the bus bar. This rib cooperates with protrusions of the panelboard insulation to position and maintain the bus bar. Such an assembled bus bar is restrained against movement transverse to its longitudinal axis. Thus, the proper spacing is maintained between adjacent buses while the creepage distance between adjacent bus bars is increased. As an alternative mounting technique, a rigid insulator extends across the parallel disposed bus bars and is rigidly secured to each of the channels in the same manner as the tap-off is fastened. The insulator is then appropriately connected to the panelboard support frame. The mounting insulator cross-section preferably avoids discontinuities in the bus bar.

It is, therefore, a primary object of the instant invention to provide an improved power tap-off means and bus bar configuration.

Another object of the instant invention is to provide a bus structure in which variable positioned power tap-off straps make contact with two sets of bus bar surfaces.

Still another object is to provide a bus structure in which two contact areas are established between a movable power strap and a bus bar and a fastening means is included to increase the contact pressure at both of these contact areas.

A further object of the instant invention is to provide a bus structure including a plurality of adjustably positioned power tap-off means wherein alignment is maintained between the power tap-off means and the bus bar at any location along the length of the bus bar.

A still further object of the instant invention is to provide a novel assembly of a power tap-off means which may be readily inserted or removed from any location along the length of a power bus bar.

Yet another object of the instant invention is to provide a bus structure in which the bus bar has a novel channel permitting an improved power tap means to be readily inserted at any point along its length and further permitting the bus bar to be maintained in an aligned position within a panelboard.

Still a further object of the instant invention is to provide a bus structure in which various power ratings of bus bars are each provided with a channel of the same cross-sectional area thereby permitting a single size of an improved power tap-off means to operate with such a plurality of bus bars.

Yet a still further object is to provide a bus structure in which the bus bar is shaped to receive a cooperating power tap-off assembly at one surface and to be attached to a panelboard at its opposite surface in a manner which will prevent movement transverse to the longitudinal axis of the bus bar.

These and other objects of the instant invention will readily become apparent after reading the following description of the accompanying drawings in which:

FIGURE 2 is an end view of the assembly of one of the bus bars and power tap-off means of FIGURE 1, with the addition of exemplary contact fingers.

FIGURE 2A is a plan view of FIGURE 2.

FIGURE 2B is a side view of FIGURE 2.

FIGURE 3 is an end view of the bus bars of FIGURE 2.

FIGURE 3A is a plan view of FIGURE 3.

FIGURE 4 is in a plan view of the power strap of FIGURE 2.

FIGURE 4A is an end view of FIGURE 4.

FIGURE 5 is a plan view of the fastener of FIGURE 2.

FIGURE 5A is an end view of FIGURE 5.

FIGURE 6 and 6A are end views of bus bars similar to FIGURE 2, but of successively higher power ratings.

FIGURE 10 is a plan view showing a manner in which the bus bar of the instant invention may be connected to the main power source.

FIGURE 10A is a side elevational view of FIGURE 10.

FIGURE 11 is a cross-section along line 11—11 of FIGURE 7A, showing the insulator bus support.

FIGURE 12 is a cross-sectional view along line 12—12 of FIGURE 7A, looking in the direction of the arrows, showing the connection of the neutral bus.

FIGURES 13 and 13a are plan and end views respectively of a power tap-off configuration readily adaptable to receive a variety of terminal connections.

FIGURES 14 and 14A are plan and end views respectively of the power tap-off structure of FIGURE 12 adapted by the interconnection of a plurality of standard terminal connectors.

FIGURES 15 and 15A are similar plan and end views respectively of the power tap-off of FIGURE 12 shown adapted to receive a barrier strip containing a plurality of screw type terminal connections.

Figure 1:
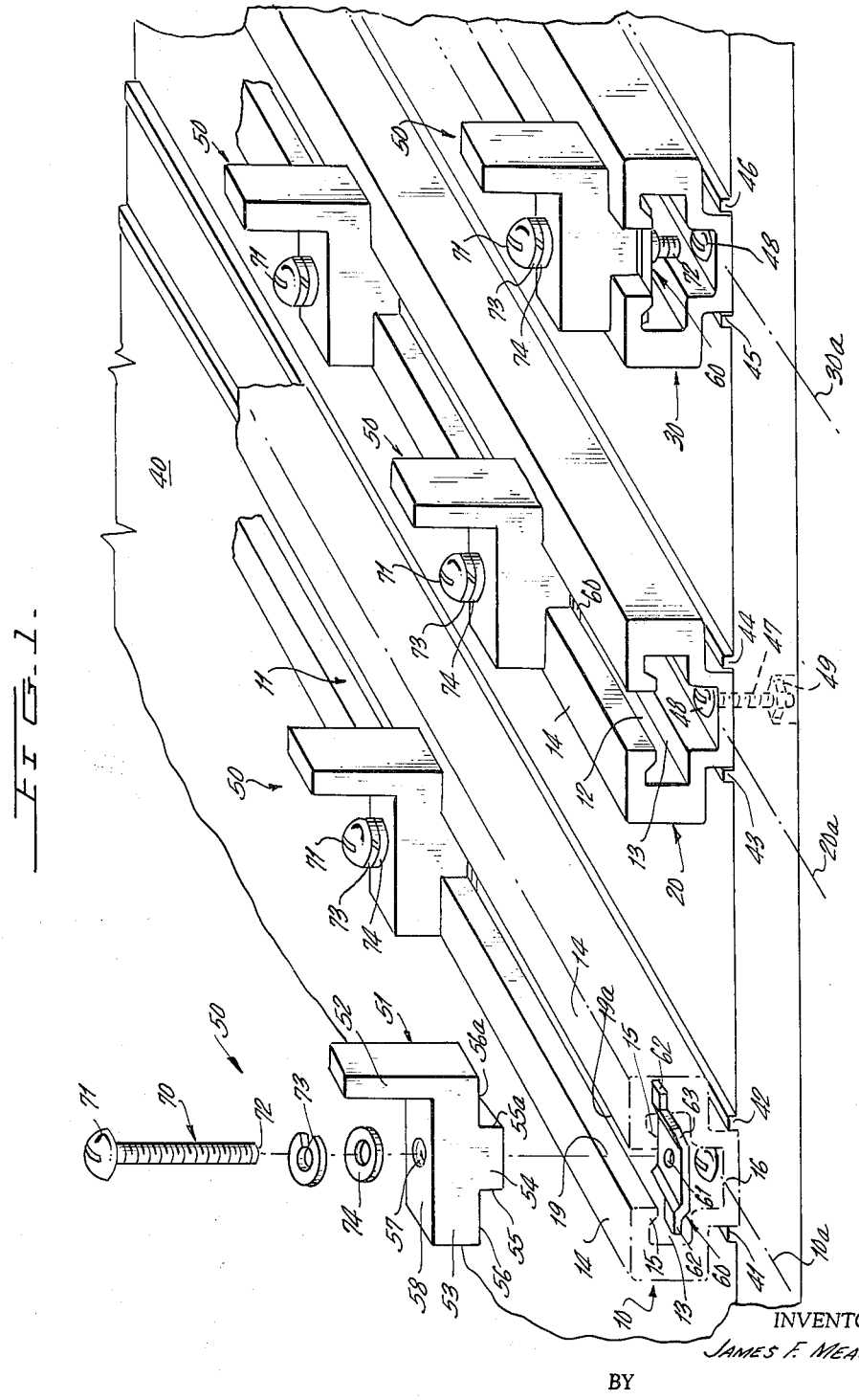
FIGURE 1 is a perspective view of a bus structure of the instant invention wherein three bus bars are shown connected to a single panelboard.

Referring first to FIGURE 1, a plurality of bus bars 10, 20 and 30 are shown with their longitudinal axes 10a, 20a, and 30a in parallel alignment. Bus bars 10, 20 and 30 are typically extruded of aluminum. Securably mounted to panelboard 40 (in a manner which will be subsequently set forth) are each of the buses. Connected to each of the bus bars 10, 20 and 30 are a plurality of variable positioned power tap-off assemblies 50 shown to be adjustably positioned along the length of the respective bus bars.

Reference is now made to FIGURES 2 through 5 which show the various members of one of the bus bars (10) and power tap assemblies 50. Bus bar 10 contains a channel 11 along its length. Channel 11 contains a throat section 12 and an interior section 13 to form a generally T-shaped transverse cross-section. Throat section 12, which is significantly narrower than the interior section 13, extends from the top surface 14 of the bus bar towards the interior section 13. Bevelled surfaces 15 are contained within the channel, lateral to throat section 12. A rib section 16 is also shown extending from the bottom surface 17 of the bus bar. Rib section 16 may contain a number of openings 18 along its length for attachment of the bus to the panelboard assembly. Alternatively, bus 10 may be secured to the panelboard by an insulated bus support extending into channel 11, as will be subsequently set forth in conjunction with the discussion of FIGURE 7A.

Power strap means 51 contains a contactor portion 52, which may be of any convenient shape depending upon the particular connections to be made to the bus bar. The bus engaging portion of contactor 51 is of a generally T-shape, containing an arm section 53 and a leg section 54. When power strap 51 is inserted in bus 10, the opposite leg surfaces 55 and 55a make electrical contact with opposite surfaces 19 and 19a of the channel throat section to establish a first set of electrical contact surfaces. At the same time, arm surfaces 56 and 56a make electrical contact with top surface 14 of the bus bar to thereby establish a second set of electrical contact surfaces, respectively transverse to the first set.

Leg section 54 of strap 51 preferably has a close fit within throat section 12 of bus bar 10. This engagement of strap surfaces 55, 55a and the bus bar channel surfaces 19, 19a also serves to prevent relative rotation between these two members and thereby maintains alignment between contactor 52 of the strap and bus bar axis 10a.

Fastener 60 also contains bevelled portions 63 which are cooperatively shaped to engage the bevelled surfaces 15 of the channel. The engagement of these surfaces is such that as screw 70 is rotated clockwise to draw fastener 60 upwards a camming action will take place exerting a force on channel surfaces 19, 19a towards the longitudinal axis 10a of the bus bar. This force will thereby increase the contact force between strap surfaces 55, 55a and bus bar surfaces 19, 19a. Ears 62, in addition to limiting rotation of fastener 60, are positioned to insure alignment of fastener 60 within channel 11 during clockwise rotation of screw 70. Such alignment is necessary to insure the proper camming action between fastener portions 63 and channel surfaces 15. Thus, it is seen that the tightening of fastener 60 simultaneously increases the electrical contact forces at both the contact areas established between strap 51 and bus 10.

To prevent the members of the power tap-off assembly 50 from separating and depositing loose parts in channel 11, the lower end 72 of screw 70 is preferably crimped. Alternatively a captive fastener may be used.

The power tap-off assembly 50 may be readily inserted into or removed from bus bar 10. To insert, it is first necessary to position fastener 90° from the position shown in FIGURE 2. This will align fastener 60 with leg section 54 of the strap. The width of fastener 60 is preferably slightly less than that of channel throat section 12 to permit its easy insertion therethrough. Fastener 60 must now be lowered below channel throat section 12, to permit it to rotate 90° clockwise within channel interior section 13. Should fastener 60 have been tightened to bear against the bottom surface of strap leg 54, screw 70 is turned counter clockwise to release such engagement. The bottommost portion of channel throat surfaces 19, 19a will abut the edges 64 of the fastener 60 to prevent its rotation and thereby permit such disengagement. Once the fastener 60 is released it will be lowered into the interior section 13 of the bus bar channel. Clockwise rotation of screw 70 will then cause fastener ears 62 to abut channel surfaces 19b permitting the fastener to be drawn upwards for securing strap 51 to bus bar 10 while increasing the contact pressure at both contact areas.

To remove an installed power tap assembly it is merely necessary to turn screw 70 counter-clockwise a sufficient amount to lower the ears 62 of fastener 60 below the bevelled surfaces 15 of the channel. The screw head 71 is then rotated 90° counterclockwise and raised to thereby capture fastener 60 within the bottommost portion of throat section 12. The assembly 50 may now be removed from bus bar 10.

Contactor portion 52 of strap 51 is one of numerous exemplary configurations. Such a contactor surface provides a convenient means to be engaged by contactor fingers such as 75, 76 which might be operatively connected to the line terminals of a circuit breaker (not shown). Suitable bias means are included within contact housing 77 so that contact tips 78, 79 of contact fingers 75, 76, respectively, are urged toward one another.

In a preferred embodiment of the instant invention bus 10 and strap 51 were constructed of aluminum and screw 70 of steel. Inasmuch as these metals have different thermal coefficients of expansion, continuous cycling of the power tends to reduce the electrical contact pressures between strap 51 and bus bar 10. To prevent this a means is provided to maintain the contact forces at both contact areas (55, 55a–19, 19a; 56, 56a–14) under temperature extremes. One such method is to place a spring lock washer 73 between head 71 of screw 70 and top surface 58 of strap 51. A second washer 74 may also be preferably included to protect the upper surface 58 against the protruding edge of split lock washer 73. An alternative means of compensating for temperature extremes is to construct fastener 60 out of a spring tempered metal.

In one embodiment of my invention longitudinal rib 16 is shown extending from the bottom surface 17 of the bus bar. Rib 16 contains openings 18 which provide a convenient way of securing bus bar 10 to insulation plate 40 of the panelboard. Openings 18 register with corresponding opening 47 in the panelboard insulation 40 (best shown in FIGURE 1). A fastening means, such as screw 48 is inserted through opening 18 and 47 to attach the bus bars (10, 20, 30) to the insulator 40. Nut 49, or any other alternative means, secures screw 48 to the panelboard insulation. The inner portion of extending rib 16 is hollowed sufficiently to contain the head of screw 48 and lower end 72 of screw 70. Insulation plates 40 is provided with longitudinal protrusion pairs 41–42, 43–44, and 45–46 positioned at the intended installation locations for the bus bars. The spacing between the individual protrusions of each set, such as 41 and 42, corresponds to the width of rib 16. Thus, protrusions 41–42 bearing against the opposite ends of rib 16 will prevent movement of bus bar 10 transverse to its longitudinal axis 10a. The distance between each set of protrusions 41–42, 42–43 equals the necessary creepage distance which must be maintained between the bus bars. Inasmuch as a variety of molded case circuit breaker frames are presently available to operate with such buses, a single insulation may be used for all such panelboards thereby effecting a considerable manufacturing cost saving. The hollowing out of bus bar 10 by channel 11 results in a bus bar having a large internal surface area accessible to the ambient surroundings. Such a large exposed surface area facilitates heat dissipation. Also, the hollowed interior portion of rib 16 increases this internal surface area to thereby maximize the heat dissipation capabilities of the bus bar 10.

FIGURES 6 and 6A depict bus bars 10a and 10b which are similar to bus bar 10 but of successively higher rating. It is seen that the channel 11 dimensions are maintained within such bus bars. The increase in cross-sectional area to provide for the additional current carrying capacity may be made at the end surfaces 25, 26 remote from the channel. Thus, the same power tap-off assembly 50 may be employed with bus bars 10, 10a and 10b of increased power capacity.

Figure 7:
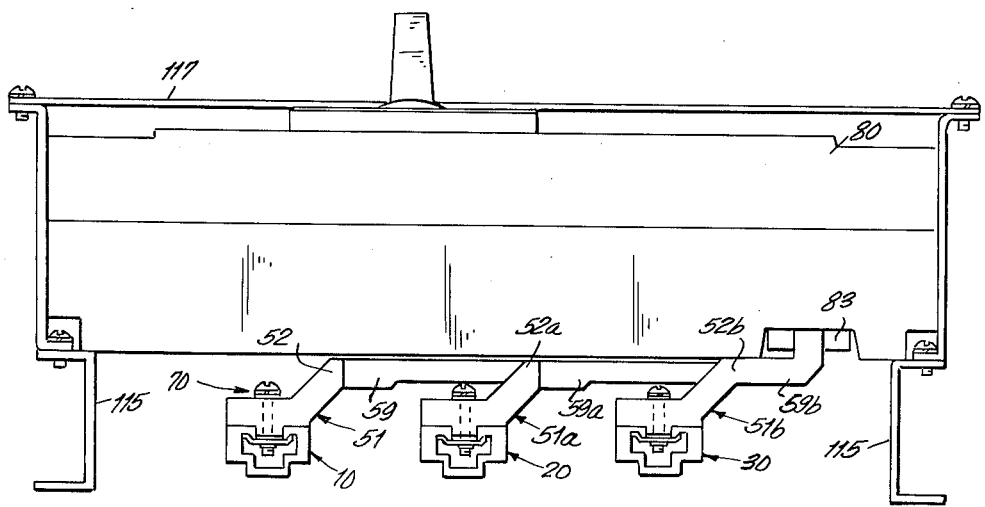
FIGURE 7 is an end view which depicts the instant invention being employed in the installation of a circuit breaker to a panelboard.
Figure 7A:
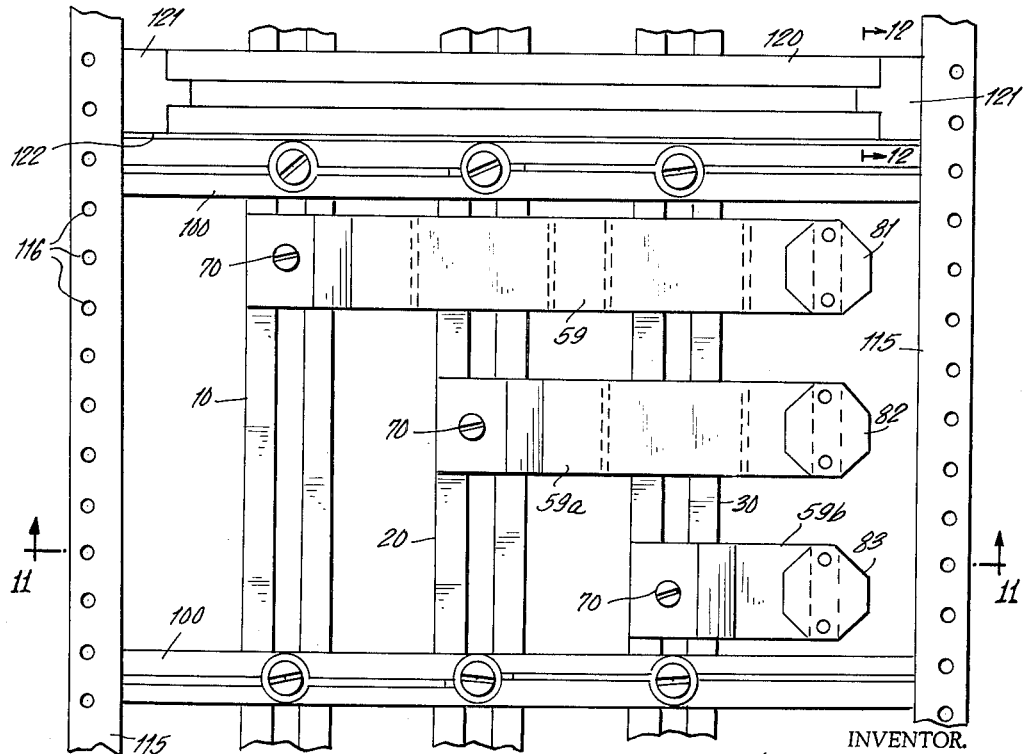
FIGURE 7A is a plan view of FIGURE 7, with the circuit breaker shown in phantom, showing a preferred mounting arrangement of the bus bars to the equipment frame and the addition of a neutral bus.

FIGURES 7 and 7A illustrate a preferable panel board construction embodying the teaching of my invention. Power tap-off is made by a strap contactor configuration especially adapted to operate with a presently available type of three phase molded case circuit breaker. Panelboard 40 comprises bus bars 10, 20 and 30 in longitudinal alignment and rigidly secured to side angle supports 115 by longitudinally spaced insulated bus supports 100. Supports 100 are secured to each of the bus bars (best shown in FIGURE 11) and fastened to side angle supports 115 to provide a rigid structure. Side angle 115 contains apertures 116 appropriately placed to mount circuit breaker 80. Upstanding brackets are provided to receive a panelboard cover 117, appropriately apertured to provide access to circuit breaker 80. The panelboard may also include a neutral bus 120. Neutral bus 120 is preferably of the same configuration as the main buses, and is secured to side angle supports 115 by insulator blocks 121. Blocks are slotted to rigidly contain the cross-section of the neutral bus 120, as best shown in FIGURE 12. An insulator strip 122 separates neutral bus 120 from the ends of the main buses.

Circuit breaker 80 may be of the type shown in U.S. Patent No. 2,648,742, entitled "Arc Chute Plate," to W. H. Edmunds, August 11, 1953, and assigned to the assignee of the instant invention. Contactor sets 81, 82 and 83 of circuit breaker 80 are seen to be in alignment parallel to the longitudinal bus axes 10a, 20a, 30. Straps 51, 51a and 51b are shown connected to bus bars 10, 20 and 30, respectively. These straps are longitudinally placed to correspond with the bus contacts 81, 82 and 83, respectively. The contacting portions 52, 52a and 52b terminate to make a direct connection to the contacts of circuit breaker 80. Contacting portions 52, 52a and 52b contain transverse portions 59, 59a and 59b of different lengths extending from their respective buses to the circuit breaker contacts. Should other types of circuit breaker frames presently available in the art be attached to the panel board and bus structure of the instant invention, it is merely necessary to provide for an appropriate configuration of strap contactor portion 52 to permit such connections, as shown in FIGURES 8 and 9.

Figure 8:
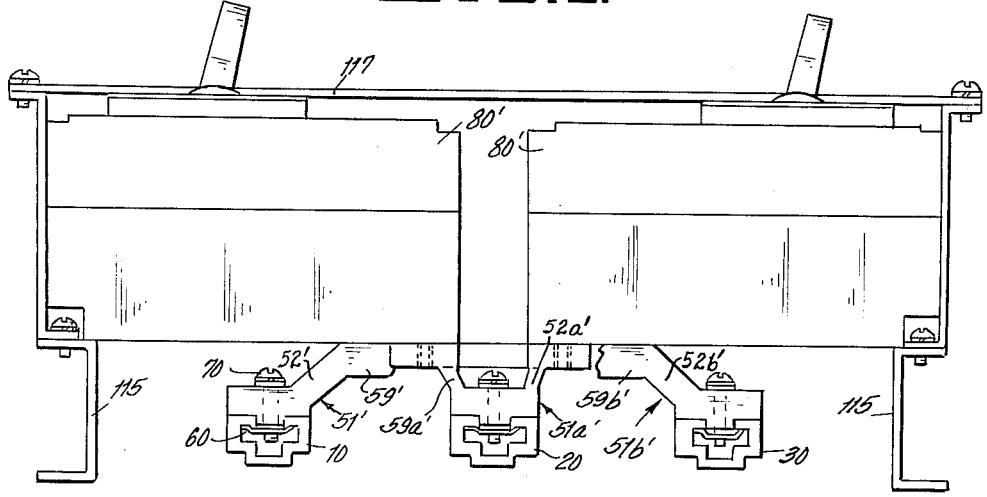
FIGURES 8 and 8A are end and top views respectively showing the installation of a different size circuit breaker frame to a panel board having bus bars constructed in accordance with the teachings of my invention.
Figure 8A:
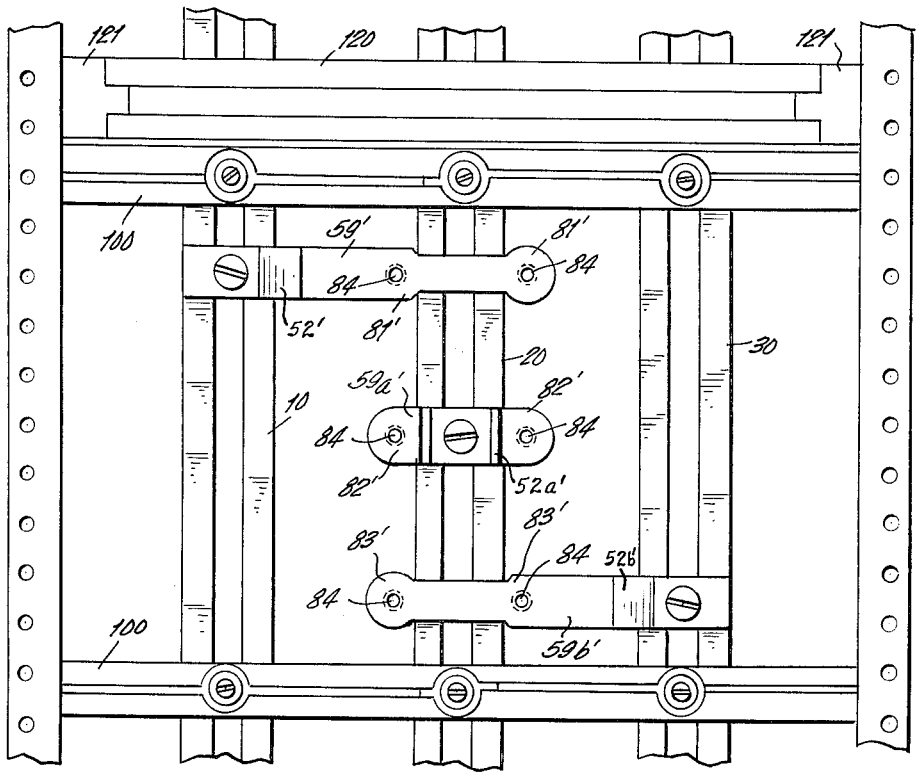

FIGURES 8 and 8A illustrate the installation of a different size frame three phase molded case circuit breaker 80', of the type shown in U.S. Patent No. 3,043,939, filed November 13, 1958, entitled "Separate Phase Directed Venting," to C. Gryctko, and assigned to the assignee of the instant invention. Breakers 80' are sufficiently smaller than breaker 80 to permit parallel pairs to be arranged along the length of the bus bars located within panelboard 40. Contactor sets 81', 82' and 83' of each of the pair of circuit breakers 80' are disposed in parallel alignment along the longitudinal axis of the buses, the contacts of each of the adjacent pairs being laterally displaced. Contactor straps 51', 51a' and 51b' are shown connected to bus bars 10, 20 and 30 respectively in a similar fashion at the connection of straps 51, 51a and 51b shown is FIGURE 7. These straps are longitudinally placed along the length of the bus to correspond with the placement of bus contacts 81', 82' and 83' of circuit breaker pairs 80' respectively. Contactor portion 52', 52a' and 52b' contain appropriately sized transverse portions 59', 59a' and 59b' of different lengths extending from their respective buses to their associated circuit breaker contacts. Each of the straps contains appropriately placed apertures 84 threaded to receive a screw type terminal interconnected to contactor set 81', 82' and 83' of the circuit breaker.

Figure 9:
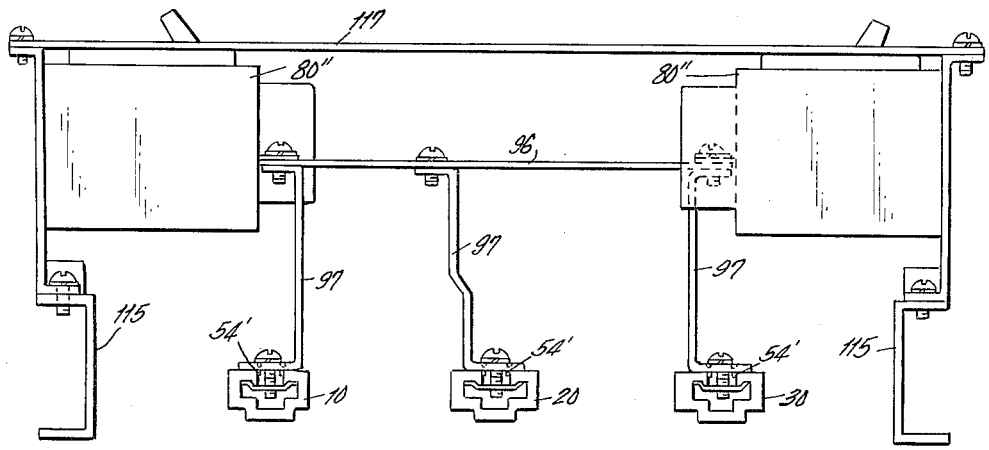
FIGURES 9 and 9A are similar end and plan views respectively showing still another circuit breaker frame installed to the panel board.
Figure 9A:
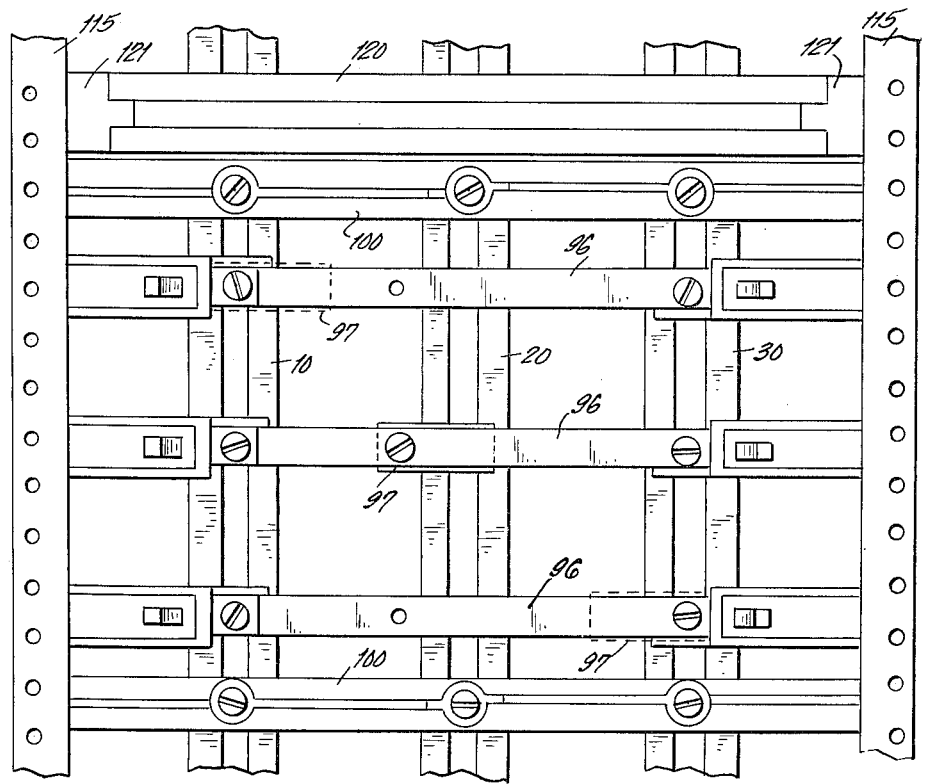

FIGURES 9 and 9a show a still further arrangement whereby individual single phase circuit breakers 80" of the type shown in U.S. Patent No. 2,976,385, filed April 3, 1959, entitled "Circuit Breaker for Bolted and Plug-in Constructions," to W. H. Edmunds, and assigned to the assignee of the instant invention, are shown installed. Circuit breakers 80" are connected in pairs by conducting strap 96 electrically connecting pairs of circuit breakers to be connected to a single bus. Terminal tap-off 97 makes contact with the associated buses 10, 20, 30, in the preferable manner of my invention, and interconnects conducting straps 96 to the bus. Where the low current ratings of the circuit being protected do not make it necessary to engage surfaces 19, 19a, the projector 54' of tap-off 97 may be simplified by merely consisting of stamped projections to maintain alignment with respect to the bus channel.

FIGURES 10 and 10A illustrate a manner in which a bus bar of the instant invention may be connected to the main lugs of the power source. Set screw 90 holds an aluminum insert 91 in place. Screws 92 and 93 of main lug 94 thread into steel inserts 95 to permit horizontal contact pressure between main lug 94 and bus bar top surface 14 of bus 10. A space 96 is provided between insert 91 and main lug 94 to insure proper contact pressure between main lug 94 and bus bar top surface 14.

Buses 10, 20, and 30 are preferably shown secured to the panel board support frame by laterally placed bus support 100 as shown in FIGURE 11. Supports 100 are appropriately placed along the length of the parallel disposed bus bars to provide the necessary support. Bus support 100 contains extending portion 101, dimensioned to enter the throat section 12 of the parallel disposed bus bars 10, 20 and 30. Bus support 100 is appropriately interconnected to each of the bus bar channels by fastener 60 and screw 70, in the same manner set forth above in conjunction with the interconnection with the power tap-offs to the bus bar. Openings 103 at the end of bus support member 100 are appropriately placed to mate with openings of the panelboard support and to receive self-tapping screws 104, thereby securing the assembly to the panelboard structure. Member 100 is typically constructed of an insulating material providing both the necessary electrical isolation between buses and the requisite structural support, such as a polyester.

Neutral bus 120, preferably of the same cross-section as the main buses, is snugly contained within slotted opening 123 of insulator support blocks 121, as shown in FIGURE 12. Blocks 121 are in turn fastened to angle supports 115 by self-tapping screws 124.

Reference is now made to FIGURES 13–15, which illustrate another exemplary configuration of a power tap-off, which utilizes a universal member readily adaptable to receive a plurality of terminal configurations. Member 110 includes portions 54, 55, 56, 55a and 56a corresponding to those shown in FIGURE 4A for interconnection to the bus bar. Oppositely extending portions 111 include apertures 112, which may receive standard terminal connectors as shown in FIGURE 14. Lateral grooves 113 along the terminal receiving surfaces are provided to mate with extensions 114 of the standard terminals, thereby maintaining alignment. Alternatively, extending surfaces 111 may be secured to a length of barrier strip 117, containing a plurality of screw-type terminals, as shown in FIGURES 15, 15A. Alternatively, various other terminal configurations may be appropriately connected to 110, in accordance with the requirements of a particular installation.

Thus, I have provided a novel bus bar and power tap-off assembly yielding improved electrical, mechanical and thermal properties over the structures of the prior art.

Although I have described preferred embodiments of my novel invention, many variations and modifications will now be apparent to those skilled in the art, and I therefore prefer to be limited not by the specific disclosure herein, but only by the appended claims.

The embodiments of the invention in which an exclusive privilege or property is claimed are defined as follows:

1. A bus structure comprising a bus bar and at least one power tap means; said bus bar having a channel along a first longitudinal surface thereof; said channel having a throat section and an interior section, and having a transverse cross-section such that said interior section has a larger dimension than said throat section; said throat section extending from said first surface towards said interior section; said power tap means including a unitary strap; said strap including a leg section and an arm section, and having a transverse cross-section such that said arm section has a larger dimension than said leg section; said leg section being operatively contained within said channel throat section in engagement with portions of said bus bar defining said throat section, said portion constituting a first electrical contact area; said arm section abutting said bus bar first surface to constitute a second electrical contact area; means to securably attach said strap to said bus bar; and said last mentioned means also increasing the contact force at said first and second contact areas.

2. A bus structure comprising a bus bar and at least one power tap means; said bus bar having a channel along a first longitudinal surface thereof; said channel having a throat section and an interior section, and having a transverse cross-section such that said interior section has a larger dimension than said throat section; said throat section extending from said first surface towards said interior section; said power tap means including a unitary strap; said strap including a leg section and an arm section, and having a transverse cross-section such that said arm section has a larger dimension than said leg section; said leg section being operatively contained within said channel throat section in engagement with portions of said bus bar defining said throat section, said portion constituting a first electrical contact area; said arm section abutting said bus bar first surface to constitute a second electrical contact area; fastener means operatively contained in said channel interior section to securably attach said strap to said bus bar; and said fastener means also increasing the contact force at both of said first and second contact areas.

3. A bus structure comprising a bus bar and at least one power tap means; said bus bar having a channel along a first longitudinal surface thereof; said channel having a throat section and an interior section, and having a transverse cross-section such that said interior section has a larger dimension than said throat section; said throat section extending from said first surface towards said interior section; said power tap means including a unitary strap; said strap including a leg section and an arm section, and having a transverse cross-section such that said arm section has a larger dimension than said leg section; said leg section being operatively contained within said channel throat section in engagement with portions of said bus bar defining said throat section, said portions constituting a first electrical contact area; said arm section abutting said bus bar first surface to constitute a second electrical contact area; fastener means operatively contained in said channel interior section to securably attach said strap to said bus bar; said fastener means including a beveled portion operatively engaging a cooperatively shaped beveled surface of said channel interior section to exert a force towards the longitudinal axis of said bus bar and increase the contact force at said first contact area; said fastening means also exerting a force to urge said arm section against said bus bar first surface and increase the contact force at said second contact area.

4. A bus structure comprising a bus bar and at least one power tap means; said bus bar having a channel along a first longitudinal surface thereof; said channel having a throat section and an interior section, and having a transverse cross-section such that said interior section has a larger dimension than said throat section; said throat section extending from said first surface towards said interior section; said power tap means including a strap; said strap including a leg section and an arm section, and having a transverse cross-section such that said arm section has a larger dimension than said leg section; said leg section being operatively contained within said channel throat section in engagement with portions of said bus bar defining said throat section, said portions constituting a first electrical contact area; said arm section abutting said bus bar first surface to constitute a second electrical contact area; fastener means operatively contained in said channel interior section to securably attach said strap to said bus bar; and said fastener means also increasing the contact force at both of said first and second contact areas; said power tap means being a unitary assembly accessible from the exterior of said bus bar for removal and insertion thereto.

5. A panelboard comprising a plurality of longitudinally extending bus bars; the longitudinal axis of said bus bars being disposed in substantially parallel alignment; each of said bus bars having a channel along a longitudinal surface thereof; said channel having a throat section and an interior section, and having a transverse cross-section such that said interior section has a larger transverse area than said throat section; said throat section extending from said first surface towards said interior section; a bus support means extending transverse to said bus bars; said support means including a plurality of projections extending into the throat section of each of said bus bars; fastening means securing each of said bus bars to said support means; said support means adapted to be connected to a panelboard support frame, thereby rigidly securing said buses to said support frame.

6. A bus structure comprising a bus bar and at least one power tap means; said bus bar having a channel along a first longitudinal surface thereof; said channel having a generally T-shaped portion including a throat section and an arm section; said throat section extending from said first surface towards said arm section, said power tap means including a strap; said strap having a generally T-shaped unitary transverse cross-section including a leg section and an arm section; said strap leg section being operatively contained within said channel throat section in engagement with portions of said bus bar defining said throat section, said portions constituting a first set of electrical contact surfaces; said strap arm section being external to said channel and abutting said bus bar first surface to constitute a second set of electrical contact surfaces; means to securably attach said strap to said bus bar; and said means also increasing the contact force at said first and second sets of contact surfaces.

7. A bus structure comprising a bus bar and at least one power tap means; said bus bar having a channel along a first longitudinal surface thereof, said channel having a generally T-shaped portion including a throat section and an arm section; said throat section extending from said first surface towards said arm section; said power tap means including a strap; said strap having a generally T-shaped unitary transverse cross-section including a leg section and an arm section; said strap leg section being operatively contained within said channel throat section in engagement with portions of said bus bar defining said throat section, said portions constituting a first set of electrical contact surfaces; said strap arm section being external to said channel and abutting said bus bar first surface to constitute a second set of electrical contact surfaces; fastener means to securably attach said strap to said bus bar; said fastener means including a beveled portion operatively positioned to engage cooperatively shaped beveled surfaces of said channel to exert a force towards the longitudinal axis of said bus bar and increase the contact forces at said first set of contact surfaces; said fastening means also exerting a force to urge said strap arm section against said bus bar first surface to increase the contact force at said second set of contact surfaces; and said channel beveled surface being lateral to said throat section.

8. The panelboard of claim 5, wherein said fastening means includes a fastener operatively contained in said channel interior section to securably attach said bus support means to said bus; said fastener including a beveled portion operatively engaging a cooperatively shaped beveled surface of said channel interior section to exert a force towards the longitudinal axis of said bus, thereby providing firm engagement between said bus support projection and the throat section of said bus bar.

9. The panelboard of claim 8, wherein said fastener includes screw receiving means; said screw receiving means being operatively engaged by a screw accessible from the exterior of said bus bar; said fastener also including means to limit its rotation within said channel.

References Cited by the Examiner

UNITED STATES PATENTS

| | | | |
|---|---|---|---|
| 1,155,243 | 9/15 | Jordahl | 50—477 |
| 1,588,628 | 6/26 | Sellers | 50—476 |
| 1,741,804 | 12/29 | Zilliox | 339—272 X |
| 2,175,245 | 10/39 | Brockman | 339—21 |
| 2,196,383 | 4/40 | Buchanan. | |
| 2,218,545 | 10/40 | Morten | 339—21 |
| 2,295,377 | 9/42 | Arters | 174—70 |
| 2,348,665 | 5/44 | Von Gehr | 339—21 |
| 2,445,463 | 7/48 | West | 174—70 |
| 2,633,764 | 4/53 | Ruser | 269—95 X |
| 2,676,680 | 4/54 | Kindorf | 60—477 X |
| 2,696,139 | 12/54 | Attwood. | |
| 2,767,609 | 10/56 | Cousino | 151—41.75 X |
| 2,928,512 | 3/60 | Slater et al. | 248—243 X |
| 2,969,421 | 1/61 | Scott | 339—21 X |
| 3,018,320 | 1/62 | Rowe | 339—22 X |
| 3,081,442 | 3/63 | Platz | 339—21 X |

FOREIGN PATENTS

| | | |
|---|---|---|
| 60,404 | 4/54 | France. |
| 1,206,998 | 8/59 | France. |

JOSEPH D. SEERS, *Primary Examiner.*

PATRICK A. CLIFFORD, *Examiner.*